Patented Sept. 13, 1949

2,481,807

UNITED STATES PATENT OFFICE 2,481,807

METHOD OF PRODUCING MONOFLUOROPHOSPHATES

Carl O. Anderson, Tulsa, Okla., assignor to Ozark-Mahoning Company, Tulsa, Okla., a corporation of Delaware No Drawing. Application November 28, 1947, Serial No. 788,675

9 Claims. (Cl. 23—50)

This invention relates to the production of monofluorophosphates, particularly the sodium and potassium monofluorophosphates ($Na_2PO_3F$ and $K_2PO_3F$), these being salts of monofluorophosphoric acid ($H_2PO_3F$) from which they may be prepared by reaction between the acid and sodium and potassium hydroxide (NaOH and KOH) respectively. But the sole practical commercial method of producing this acid of which I am aware is by reaction between hydrogen fluoride (HF) and a suitable compound of phosphorus such as the pentoxide ($P_2O_5$), metaphosphoric acid ($HPO_3$) or the like which is of course attended by all the problems common to reactions in which HF, one of the most reactive chemical agents known, is used as one of the reactants, while the amenability of the $H_2PO_3F$ to hydrolysis further complicates the manufacture of said monofluorophosphates in this way.

It is therefore an object of the present invention to provide a novel method of producing an alkali metal monofluorophosphate in which it is not necessary initially to employ $H_2PO_3F$, yet one capable of yielding high, almost theoretical quantities of the salt by reaction between stoichiometric proportions of other suitable starting ingredients under controlled conditions.

A further object is to provide a method whereby through reaction between comparatively easily available salts such as the fluoride and corresponding metaphosphate of an alkali metal, a third salt, the monofluorophosphate of the metal may be produced.

Other objects, purposes and advantages of the invention will hereinafter more fully appear or will be understood from the following description of what I now consider as the best manner of practising it.

It will be appreciated that as with many chemical processes having to do with fluorine and its compounds care must be taken in the selection of vessels in which the reaction is to be carried out, as some materials of which chemical equipment is made are attacked by fluorine and its compounds although not noticeably affected by many other substances.

Thus in laboratory preparation of the said alkali metal monofluorophosphates I prefer to use platinum or silver vessels and for production on a commercial scale suitable equipment made of or coated with substances relatively inert to the action of fluorine compounds, although iron equipment is satisfactory where 100% purity of the product is not essential.

The monofluorophosphates of sodium and potassium, which metals as a group will hereinafter be designated generically by the symbol Me, may be produced in accordance with the present method from the fluoride (MeF) and the metaphosphate ($MePO_3$) of the respective metals although other phosphates may be used provided they yield the metaphosphate on dehydration by heat. Thus the dihydrogen orthophosphates ($MeH_2PO_4$) and/or the dihydrogen pyrophosphates ($Me_2H_2P_2O_7$) may be used as sources of the metaphosphates if desired. Furthermore the acid fluorides ($MeHF_2$) may be substituted for the fluorides (MeF) provided that when this substitution is made a suitable agent such as a quantity of the metal carbonate ($Me_2CO_3$) equivalent to the acid hydrogen of the difluoride be supplied to neutralize the latter as will hereafter more fully appear.

In practising the invention I have found it is only necessary to bring the metaphosphate ($MePO_3$) and the fluoride (MeF) together in a suitable vessel which is inert or substantially so to the mixture of these salts and to their reaction product and to close the vessel sufficiently tightly to substantially exclude moist air during heating to fusion and subsequent cooling of its contents. If complete fusion is not attained during the heating the mass may be only sintered and the yield of the monofluorophosphate will be less than normal, but there is apparently no advantage to be gained from prolonging the heating once complete fusion of the mass to a homogeneous liquid has been attained, while the rate of cooling is also apparently unimportant, although it is preferred that it be carried out under conditions substantially excluding atmospheric moisture.

While it is convenient to carry out the invention as a "batch" process, particularly when small quantities are involved, as in the laboratory, employment of a continuous process for commercial production of the monofluorophosphates is envisaged.

When starting materials other than the fluoride and the metaphosphate are selected certain preliminary operations are advisable although they can be omitted if desired as their functions may be substantially accomplished incidentally to the main reaction. Thus when phosphates other than the metaphosphate are employed they are preferably initially dehydrated by heating to about 300° C. to eliminate the combined, and of course any free, water before the phosphate is mixed with the fluoride. If this is not done there may be excessive hydrolysis losses due to the presence of water in the reacting mass $$(MeH_2PO_4 + Heat \rightarrow MePO_3 + H_2O)$$

Moreover when the acid fluoride ($MeHF_2$) is employed instead of the fluoride ($MeF$) and as noted the corresponding carbonate ($Me_2CO_3$) used to neutralize the acid hydrogen of the former, these two substances are preferably likewise heated together in stoichiometric proportions to release water and carbon dioxide in accordance with the equation:

$$2MeHF_2 + Me_2CO_3 + Heat \rightarrow 4MeF + H_2O + CO_2$$

the resultant fluoride ($MeF$) then being combined with the metaphosphate and heated to fusion as has been described.

Under the preferred conditions using stoichiometric quantities of either the sodium or the potassium salts the reaction proceeds substantially to completion to the right in the equation:

$$MeF + MePO_3 = Me_2PO_3F$$

The following examples are specifically illustrative of practice of the invention:

*Example I.*—2.6373 grams KF and 5.3590 grams $KPO_3$ ground together were heated for 15 minutes at 900° C. in a platinum bottle having a close fitting cover. When removed from the furnace the material was completely molten, and after cooling the reaction product analyzed 99.4% $K_2PO_3F$ and 0.7% $KPO_3$, the difference between their total of 100.1% and 100.0% being unavoidable analytical error. The absence of free or unreacted KF in the reaction product was confirmed by observation that the latter gave no sign of the deliquescence characteristic of substances containing free KF and also by use of calcium nitrate in acid solution under such conditions that as little as 1% free KF could have been detected; the absence of soluble unreacted $KPO_3$ was demonstrated by the failure of silver nitrate solution to produce a precipitate in a solution obtained from the product.

*Example II.*—2.2863 grams KF and 4.6455 grams $KPO_3$, similarly ground and heated for 13 minutes but at 800° C. on removal, were found to be sintered to a unitary mass but not entirely melted. Analysis at 97.6% $K_2PO_3F$ and 2.0% $KPO_3$ indicated the total 99.6% also contains an analytical error as no evidence of free KF was observed in the reaction product. Absence of free KF was further confirmed by disappearance of the turbidity produced in solutions of the products by $CaCl_2$ solution on addition of acid to pH 2.

*Example III.*—1.3764 grams NaF and 3.3424 grams $NaPO_3$, mixed and heated in a platinum bottle for 9 minutes in a furnace operating at 660° C., yielded after cooling a completely soluble mass of substantially 100% pure $Na_2PO_3F$, the calcium nitrate test showing entirely negative results and thus indicating less than 1% free fluoride in the reaction product.

Thus it may be concluded the reaction between MeF and $MePO_3$ proceeds substantially to completion in accordance with the indicated equation to produce a monofluorophosphate ($Me_2PO_3F$); that relatively insignificant weight losses occur, possibly as a result of some escape of constituents in gas or vapor form, and that substantial yields of $Me_2PO_3F$ may be readily obtained and can be separated from the insolubles in the reaction mass by solution in water and recrystallization.

Solutions of the monofluorophosphates, when treated with solid silver nitrate, produce flat platelets and/or crystals of silver monofluorophosphate ($Ag_2PO_3F$), the yield of which is substantially increased by adding 95% alcohol to the filtrate. In one test the total precipitate of $Ag_2PO_3F$ obtained in this manner was 95.6% of theoretical, indicating a high degree of purity of the original $Me_2PO_3F$ solutions obtained by dissolving the products of my method in water.

Commercial uses of these monofluorophosphates are as yet not highly developed, due probably in large part to the lack heretofore of a practical commercial method for their production in quantity, but researches thus far completed indicate they may have wide application in medicine, insecticides, mothproofing, electrochemical processes and other fields.

While I have herein described with considerable particularity one manner of practising the invention, it will be understood I do not desire or intend thereby to limit or confine myself thereto as changes and modifications in the procedure will readily occur to those skilled in the art and may be made if desired without departing from the spirit and scope of the invention as defined in the appended claims.

Having thus described my invention, I claim and desire to protect by Letters Patent of the United States:

1. The method of producing the substantially pure monofluorophosphate of an alkali metal of the group consisting of sodium and potassium which comprises subjecting mixed stoichiometric proportions of the metaphosphate and the fluoride of the metal to substantial fusion and maintaining the mass at about fusion temperature until the reaction has proceeded substantially to completion while excluding moist atmosphere from the mass and confining vapors in the containing vessel.

2. The method of producing the substantially pure monofluorophosphate of an alkali metal of the group consisting of sodium and potassium which comprises mixing together in finely divided particles substantially stoichiometric proportions of the metaphosphate and the fluoride of the metal, subjecting the mixture to a temperature of substantial fusion in a closed vessel and maintaining it at about that temperature for a significant period of time while confining vapors within the vessel and excluding moist air therefrom, then cooling the reaction product substantially to room temperature before opening the vessel.

3. The method of producing the substantially pure monofluorophosphate of an alkali metal of the group consisting of sodium and potassium which comprises mixing together in finely divided particles substantially stoichiometric proportions of the metaphosphate and the fluoride of the metal, subjecting the mixture to a temperature of substantial fusion in a closed vessel and maintaining it at about that temperature until the mass has fused substantially to a homogeneous liquid while confining vapors within the vessel and excluding moist air therefrom, then cooling the reaction product substantially to room temperature before opening the vessel.

4. The method of producing the substantially pure monofluorophosphate of an alkali metal of the group consisting of sodium and potassium which comprises reacting in an anhydrous substantially closed system at approximately the fusion temperature of the mass the metaphosphate with the fluoride of the metal in accordance with the following equation:

$$MePO_3 + MeF = Me_2PO_3F$$

wherein Me represents the metal.

5. The method of producing a monofluorophosphate which comprises reacting together the fluoride and the metaphosphate of an alkali metal in stoichiometric proportions and substantially at the fusion temperature of the mass.

6. The method of producing substantially pure potassium monofluorophosphate which comprises reacting potassium metaphosphate with potassium fluoride in stoichiometric proportions at a temperature between about 800°–900° C. while inhibiting contact of moist air with the reacting mass and escape of vapors therefrom.

7. The method of producing substantially pure sodium monofluorophosphate which comprises reacting sodium metaphosphate with sodium fluoride in stoichiometric proportions at a temperature between about 600°–700° C. while inhibiting contact of moist air with the reacting mass and escape of vapors therefrom.

8. The method of producing substantially pure potassium monofluorophosphate which comprises grinding together substantially stoichiometric proportions of potassium metaphosphate and potassium fluoride to reduce them to intimately intermingled finely divided condition, subjecting the mixture to a temperature of about 800°–900° C. while confining it within a substantially closed chamber, and cooling the resultant mass in the chamber while excluding moist air therefrom and confining therein vapors produced by the reaction.

9. The method of producing substantially pure sodium monofluorophosphate which comprises grinding together substantially stoichiometric proportions of sodium metaphosphate and sodium fluoride to reduce them to intimately intermingled finely divided condition, subjecting the mixture to a temperature of about 600°–700° C. while confining it within a substantially closed chamber, and cooling the resultant mass in the chamber while excluding moist air therefrom and confining therein vapors produced by the reaction.

CARL O. ANDERSON.

REFERENCES CITED

The following references are of record in the file of this patent:

UNITED STATES PATENTS

| Number | Name | Date |
|---|---|---|
| 2,220,818 | Jelen | Nov. 5, 1940 |
| 2,408,784 | Lange et al. | Oct. 8, 1946 |